Aug. 4, 1925.
W. C. LOUD
1,548,202
AUTOMOBILE CURTAIN
Filed Nov. 24, 1922
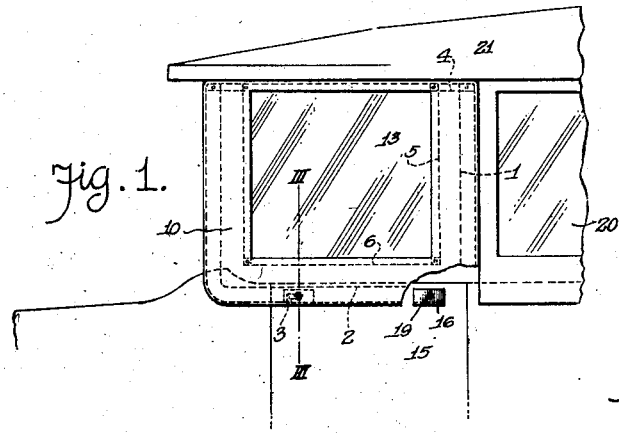
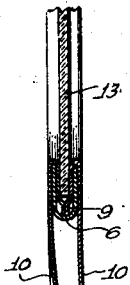
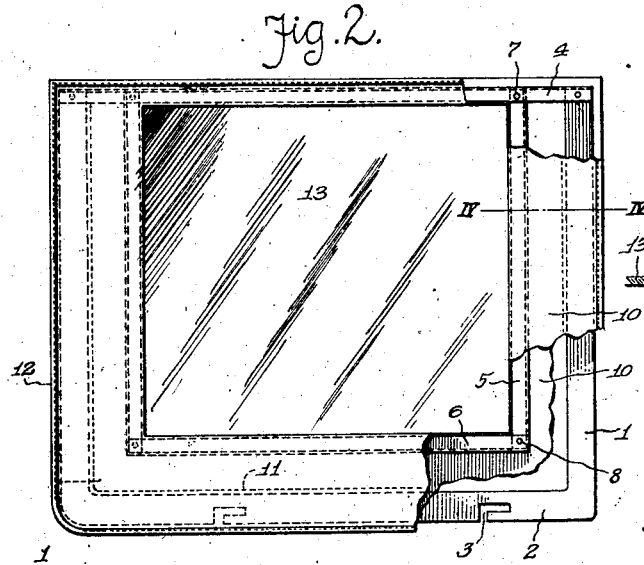
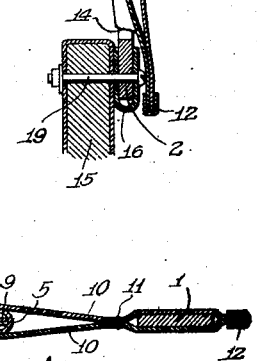
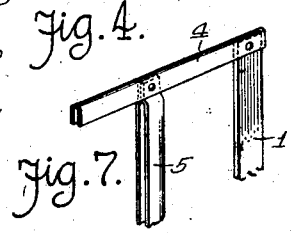
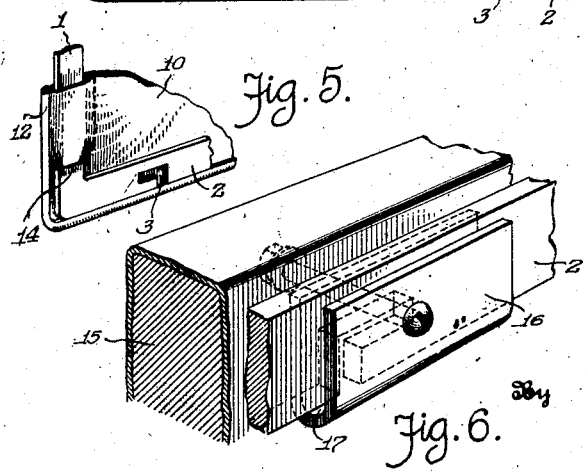
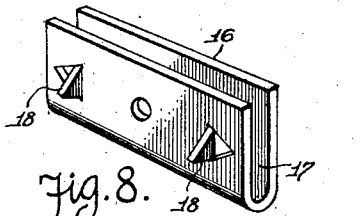
Inventor
William C. Loud.
By
Attorneys Patented Aug. 4, 1925.

1,548,202

UNITED STATES PATENT OFFICE.

WILLIAM C. LOUD, OF HIGHLAND PARK, MICHIGAN.

AUTOMOBILE CURTAIN.

Application filed November 24, 1922. Serial No. 602,946.

*To all whom it may concern:*

Be it known that I, WILLIAM C. LOUD, a citizen of the United States of America, residing at Highland Park, in the county of Wayne and State of Michigan, have invented certain new and useful Improvements in Automobile Curtains, of which the following is a specification, reference being had therein to the accompanying drawings.

My invention aims to provide an automobile curtain or panel that may be easily and quickly attached to the upper edge of a door, body wall, adjacent curtains or other supports to cooperate with a top or body structure in providing an enclosure for a vehicle body, and the manner in which the curtain or panel is attached to the door or body permits of it being easily removed and stored in the automobile body for use when occasion requires and adequately secured, when in position, against accidental displacement.

My invention further aims to provide an automobile curtain or panel wherein inner and outer frames afford a support for a transparent plate, as a pane of glass, and on the frames is a cover affording a cushion for the transparent plate in one of said frames and a connection between said frame that permits of the plate carrying frame being more or less yieldably supported so that the transparent plate will not be fractured or broken because of stresses and strains or vibrations to which the frames of the curtain may be subjected during the operation of an automobile.

My invention further aims to accomplish the above results by a durable construction that will be hereinafter considered and claimed.

Reference will now be had to the drawing, wherein

Figure 1 is a side elevation of a portion of an automobile body provided with a curtain in accordance with my invention;

Fig. 2 is a side elevation of the automobile curtain, partly broken away and partly in section;

Fig. 3 is an enlarged vertical sectional view taken on the line III—III of Fig. 1;

Fig. 4 is an enlarged horizontal sectional view taken on the line IV—IV of Fig. 2;

Fig. 5 is a perspective view of a portion of the curtain illustrating the inner wall or outer frame of the curtain;

Fig. 6 is a perspective view of a portion of the automobile body or door thereof provided with hardware adapted for supporting the curtain;

Fig. 7 is a perspective view of a portion of the frame-work of the curtain, and

Fig. 8 is a perspective view of one of the pieces of door or body hardware.

A curtain or panel comprises a substantially U-shaped outer frame 1 having a bottom member 2 with its lower edge cut away to provide bayonet shaped slots 3, and this frame is preferably made from flat material, for instance a metal bar.

Connecting the upper ends of the outer frame 1 is a channel cross or top member 4 with the ends of the outer frame extending into the channel or groove of said top member.

In spaced relation to the outer frame 1 is an inner frame comprising side rails 5 and a bottom rail 6, said rails being preferably made of channel material with the channels or grooves thereof opening into the inner frame. The side rails 5 have the upper ends thereof mounted in the channel of the top member 4 and riveted or otherwise connected thereto, as at 7. The lower ends of the side rails 5 are riveted or otherwise connected, as at 8, to the ends of the bottom rail 6, and in consequence of this construction the inner frame is suspended within the outer frame.

Extending into the grooves or channels of the rails 5 and 6 and the top member 4 are the stitched and connected edges 9 of covers 10 which enclose the rails 5 and 6 and the top member 4, and are stitched or otherwise connected together as at 11, adjacent the outer frame 1. The covers 10 extend over both sides of the frame 1 and into a binder strip 12 where the edges of the covers are stitched to said binder strip which extends around the outer edges of the frame 1.

The inner edges of the covers 10 form a channel cushion for the edges of a transparent plate 13, as a pane of glass and in consequence of this arrangement the transparent plate is more or less yieldably supported relative to the outer rigid frame 1 and therefore will not be subjected to stresses, strains and vibrations, as much as the outer frame which is adapted to be rigidly held.

The cover 10 which forms the inner wall of the curtain or panel is slitted, as at 14 so that the bottom member 2 of the outer frame 1 may be exposed or extend from between the covers, as best shown in Figs. 3 and 5, thus exposing the bayonet shaped slots 3 to facilitate mounting the curtain or panel on a support.

As an instance of the use of the curtain or panel, I have shown an automobile body door 15, and mounted on the outer wall of this door are channel shaped pieces of hardware 16, affording channels or grooves 17 into which may extend the bottom member 2 of the frame 1. The inner flanges or walls of the pieces of hardware 16 have struck out prongs 18 adapted to enter the wall 15 and position said pieces of hardware relative to the wall. In addition to these prongs each piece of hardware is held by a transverse pin 19, preferably in the form of a nut equipped bolt or screw, and these transverse pins are adapted to engage in the bayonet shaped slots 3 of the outer frame 1 and prevent vertical displacement of said outer frame relative to the wall 15. The bottom member 2 of the outer frame 1 can be placed downwardly in the pieces of hardware 16, over the pins 19 and then shifted in a lateral direction, for instance to the left considering Fig. 1, so that the pins 19 engage in the inner ends of the slots 3 and anchor the outer frame rigidly relative to the wall 15 for movement in synchronism therewith.

When the curtain or panel is mounted on a movable or stationary wall the top and side edges of the curtain or panel may be connected to other adjacent parts of the automobile or its equipment such as the curtains or panels 20 of an automobile top 21, by any suitable means, preferably of such a nature that the curtain or panel can be removed from its support after detachment from such adjacent part at any time and stored or packed away in the body of the automobile. In the application to a door as shown in Figure 1 the panel is connected to the adjacent part 20 in approximate vertical alignment with the hinges of the door 15 so that the panel is thereby locked against detachment from the door.

It is thought that the utility of my invention will be apparent without further description, and while in the drawing there is illustrated a preferred embodiment of my invention, it is to be understood that the structural elements are susceptible to such variations and modifications as fall within the scope of the appended claims.

What I claim is:—

1. An automobile curtain comprising substantially U-shaped frames, one within the other when viewed in side elevation, a member connecting ends of the outer frame and supporting ends of the inner frame, a transparent plate in the inner frame, and a cover connecting said frames.

2. An automobile curtain as called for in claim 1, and a lining stitched to said cover with the stitched portions concealed in the inner frame and affording a seat for said transparent plate.

3. The combination of an automobile body wall, pins on the upper part of said wall, a panel provided with bayonet slots in the lower part, whereby it may be longitudinally moved into supported engagement with said pins, and a cover on said frame, said cover extending over the outer side of the upper part of said wall and rendering said slots and pins invisible from the exterior of the automobile.

4. In combination with an automobile wall, a curtain upstanding from said wall, a member fixed with respect to said curtain and said automobile wall to which member one edge of said curtain is connected, pieces of hardware on the upper part of said wall, and a frame member forming part of the said curtain and provided with bayonet slotted portions slidable longitudinally on said pieces of hardware and in locked engagement therewith when said curtain is connected to said member, said curtain being bodily shiftable longitudinally on said hardware of the upper edge of said wall for the removal of said curtain upon detachment thereof from said member.

5. The combination with an automobile door and a member extending upwardly approximate to the hinge of said door, of a curtain upstanding from the door and movable therewith, pieces of hardware on the upper part of said door, a frame member forming part of said curtain and horizontally slidable on said pieces of hardware so that said curtain may be bodily shifted, longitudinally of the upper edge of said door into locked engagement with said hardware, said slidable connection permitting of said curtain being removed by movement in an opposite direction, said curtain being detachably connected to said member to prevent undesired sliding of the curtain in such opposite direction.

In testimony whereof I affix my signature in presence of two witnesses.

WILLIAM C. LOUD.

Witnesses:
 ANNA M. DORR,
 KARL H. BUTLER.